(12) United States Patent
Friedersdorf

(10) Patent No.: US 10,856,553 B1
(45) Date of Patent: Dec. 8, 2020

(54) BAKING LINER

(71) Applicant: Stephan Albert Friedersdorf, Richmond (CA)

(72) Inventor: Stephan Albert Friedersdorf, Richmond (CA)

(73) Assignee: Stephan Albert Friedersdorf, Richmond (CA)

( * ) Notice: Subject to any disclaimer, the term of this patent is extended or adjusted under 35 U.S.C. 154(b) by 0 days.

(21) Appl. No.: 16/418,997

(22) Filed: May 22, 2019

(51) Int. Cl.
*A21B 3/13* (2006.01)

(52) U.S. Cl.
CPC .................... *A21B 3/131* (2013.01)

(58) Field of Classification Search
CPC . A21B 3/131; B31B 2120/70; B31B 2110/10; A47G 19/03; A47G 21/001; B65D 1/34; B65D 3/266; B65D 2581/3405; B65D 2585/36; B65D 25/22; B65D 85/60; A47J 36/022; A47J 31/08; A47J 37/01; A47J 37/108; A47J 43/20; A21D 8/06; A23P 30/10
USPC ... 229/200, 4.5, 202, 400, 406, 125.25, 245; 220/574, 258.2, 738; 249/DIG. 1, 117, 249/112, 139, 155, 61; 99/DIG. 15, 426, 99/930; 426/512, 113, 122, 123, 282, 426/549; 493/152, 154
See application file for complete search history.

(56) References Cited

U.S. PATENT DOCUMENTS

| | | | | |
|---|---|---|---|---|
| 221,564 A | * | 11/1879 | Ingersoll | A47G 19/02 220/574 |
| 1,073,618 A | * | 9/1913 | Müller | B31B 3/00 493/73 |
| 1,164,962 A | * | 12/1915 | Sayford | A47G 19/02 220/574 |
| 2,411,857 A | * | 12/1946 | Harriss | A21B 3/131 426/302 |
| 2,758,771 A | * | 8/1956 | Bauer | G01F 19/00 229/402 |
| 4,171,085 A | | 10/1979 | Doty | |
| 4,706,873 A | | 11/1987 | Schulz | |
| D363,343 S | * | 10/1995 | Azimi-Bolourian | D23/309 |
| 9,145,234 B1 | * | 9/2015 | Dalmolin | B65D 25/22 |
| 9,555,594 B2 | * | 1/2017 | Littlejohn | A47G 19/03 |
| D819,390 S | * | 6/2018 | Facquet | D7/359 |

(Continued)

FOREIGN PATENT DOCUMENTS

JP 3106171 U3 12/2004
WO 2016181381 A1 11/2016

OTHER PUBLICATIONS

Canadian Patent Office Examination report dated Jun. 29, 2020.

*Primary Examiner* — Christopher R Demeree

(57) ABSTRACT

Examples of a baking liner for bakable products are described. The baking liner comprises a base and a peripheral sidewall that extends upward from the base forming a liner cup that is sized to receive the baked product. The sidewall has an upper edge that forms the cup's open top and a lower edge that is adjoined to the base forming a bottom edge of the liner. An opening seam is formed in the sidewall such that it extends from the upper edge toward the lower edge and across the base. A tab is formed in proximity to the opening seam and is configured to open the sidewall into a strap-like configuration by pulling the tab and opening the sidewall and the base away from the baked product.

9 Claims, 5 Drawing Sheets

(56) References Cited

U.S. PATENT DOCUMENTS

| | | | |
|---|---|---|---|
| 2007/0102437 A1* | 5/2007 | Griswold | A21B 3/132 220/772 |
| 2010/0278979 A1 | 11/2010 | Koplish | |
| 2013/0200076 A1* | 8/2013 | Farruggio | A21B 3/135 220/495.03 |
| 2015/0359245 A1 | 12/2015 | Gelbard | |

* cited by examiner

BAKING LINER

TECHNICAL FIELD

The present disclosure generally relates to a baking liner and more particularly to a baking liner with a means for easy removal of the liner from the baked goods.

BACKGROUND

Unless otherwise indicated herein, the materials described in this section are not prior art to the claims in this application and are not admitted to be prior art by inclusion in this section.

Some baked products, such as cupcakes or muffins, are typically baked in individual paper liners which are positioned in an individual cup of a muffin baking tin. The paper liners help with easy removal of the baked products from the baking cups as well as with packaging and distribution of the products, e.g. cupcakes.

Before the consumption the baking liner needs to be removed which is usually done by pinching and pulling the liner away from the baked product. This process can be time consuming, can ruin the look of the product and can be unpleasant and messy for the consumer.

SUMMARY

In one aspect, a baking liner for bakable products is provided. The baking liner comprises a base and a peripheral sidewall that extends upward from the base forming a loop. The base and the sidewall define a liner cup that is sized to receive the baked product. The sidewall has a top edge that forms the cup's open top and a lower edge that is adjoined to the base forming a bottom edge of the liner. An opening seam is formed in the sidewall that extends from the top edge to the lower edge such that the loop is at least partially discontinuous. A tab is formed in proximity to the opening seam and is configured to open the sidewall into a strap-like (butterfly) configuration by pulling the tab and opening the sidewall and the base away from the baked product.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

The present invention discloses a baking liner, such as a disposable paper liner, that includes features that can aid in separating the liner from the baked product without affecting the product. The baked product can be a muffin, a cupcake or any other cake-like product that is baked in individual liners.

Figure 1:
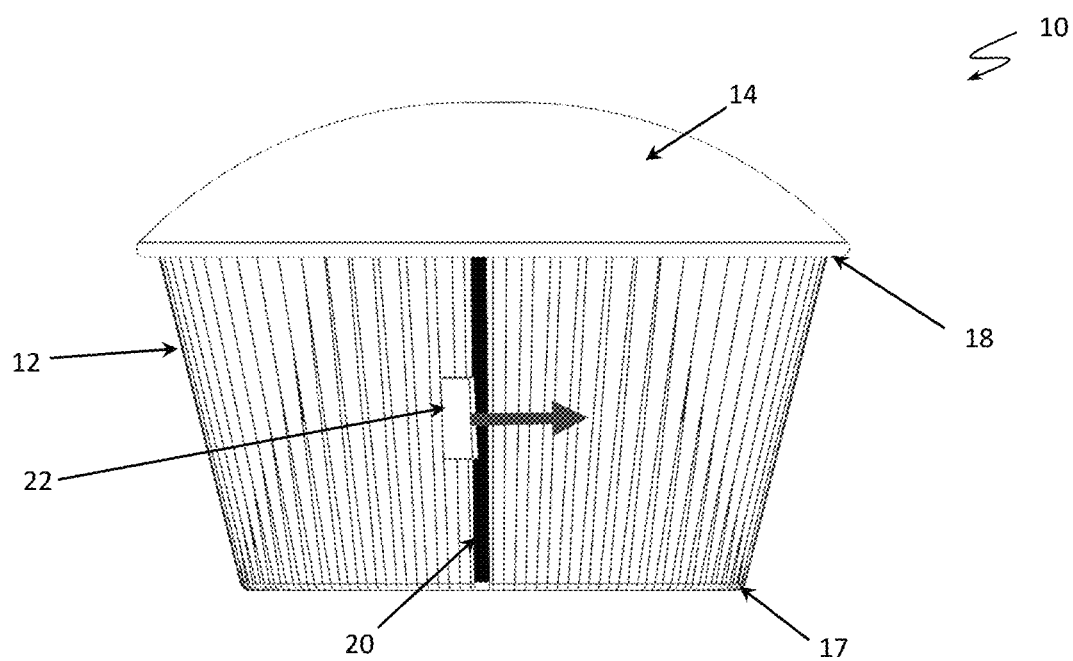
FIG. 1 is a side view of an example of a baking liner for bakable products showing an opening seam and a tab formed in proximity to the opening seam for opening and removing the liner from the baked product.
Figure 5:
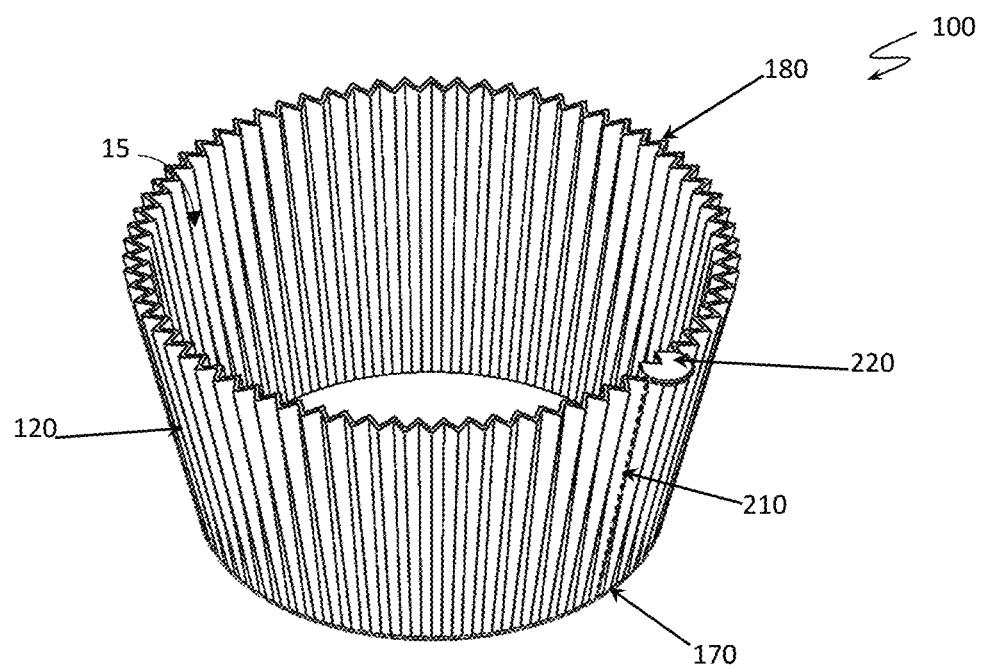
FIG. 5 is a perspective view of another example of a baking liner showing a perforated opening seam and a tab formed at the top edge in proximity to the opening seam.
Figure 6:
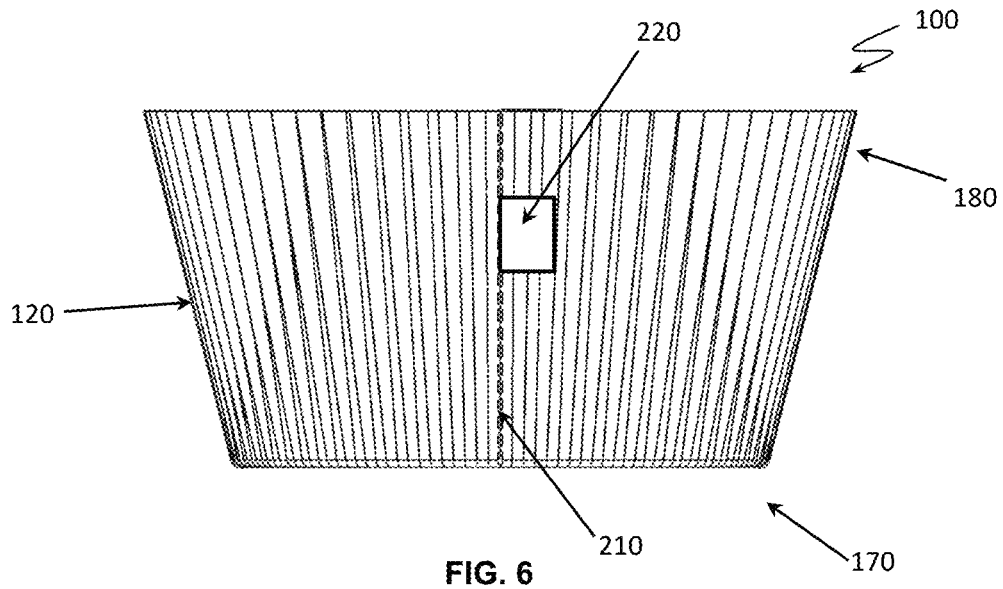
FIG. 6 is a side view of a baking liner with a tab connected to a perforated opening seam at some distance from the top edge.
Figure 7:
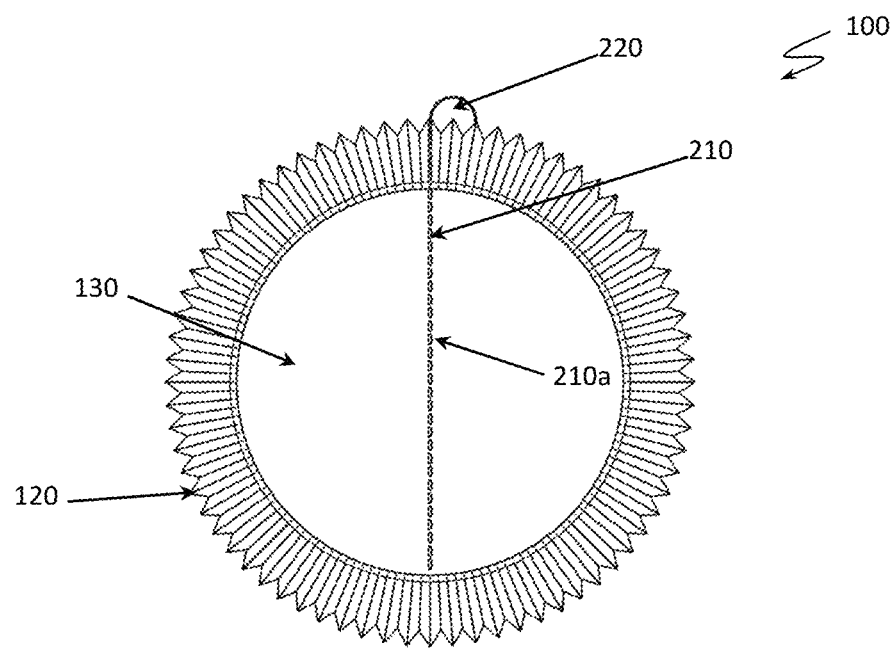
FIG. 7 is a top view of a baking liner showing the perforated opening seam extending across a base of the liner.

FIG. 1 illustrates an example of a baking liner 10 used for baking a bakable product 14. The baking liner 10 can be a disposable paper liner. The baking liner 10 comprises a peripheral sidewall 12 that loops forming a liner cup (see FIG. 5) that is sized to receive the product 14. The baked product can be a muffin or a cupcake. The sidewall 12 extends upward from a base 13 (see FIG. 2) such that a lower edge 11 of the sidewall 12 is connected to a periphery edge 16 of the base 13 forming a bottom edge 17 of the liner 10. A top edge 18 of the sidewall 12 forms the open top of the cup 15. In some implementations, the sidewall 12 of the liner 10 can be pleated. An opening seam 20 is formed in the sidewall 12 that extends from the top edge 18 toward the bottom edge 17 of the liner 10, such that the loop formed by the sidewall 12 is at least partially discontinuous. The opening seam 20 can be a small elongated cut in the sidewall 12, so that it does not compromise or affect the upward structural integrity of the sidewall 12, meaning the sidewall 12 extends upwardly from the base 13 even when a cake batter is added into the liner for baking. A pulling tab 22 is formed in proximity to the seam 20. The tab 22 can be hingedly connected to the sidewall 12 on either side of the seam 20. The tab 20 can be positioned at some distance from the top and the bottom edge 18, 17. For example, the tab 22 can be positioned close to a midpoint of the sidewall 12. In one implementation, the tab 22 can extend along seam 20 from the top edge 18 to the bottom edge 17. Persons skilled in the art would understand that the tab 22 can be positioned anywhere along the edge of the seam 20 (on either side of the seam 20), without departing from the scope of the invention. After the baking, the consumer can simply pull the tab 22 in direction that is approximately perpendicular to the axis of the seam 20 to peel the sidewall 12 in open configuration, as illustrated in FIG. 3, and away from the baked product 14.

Figure 2:
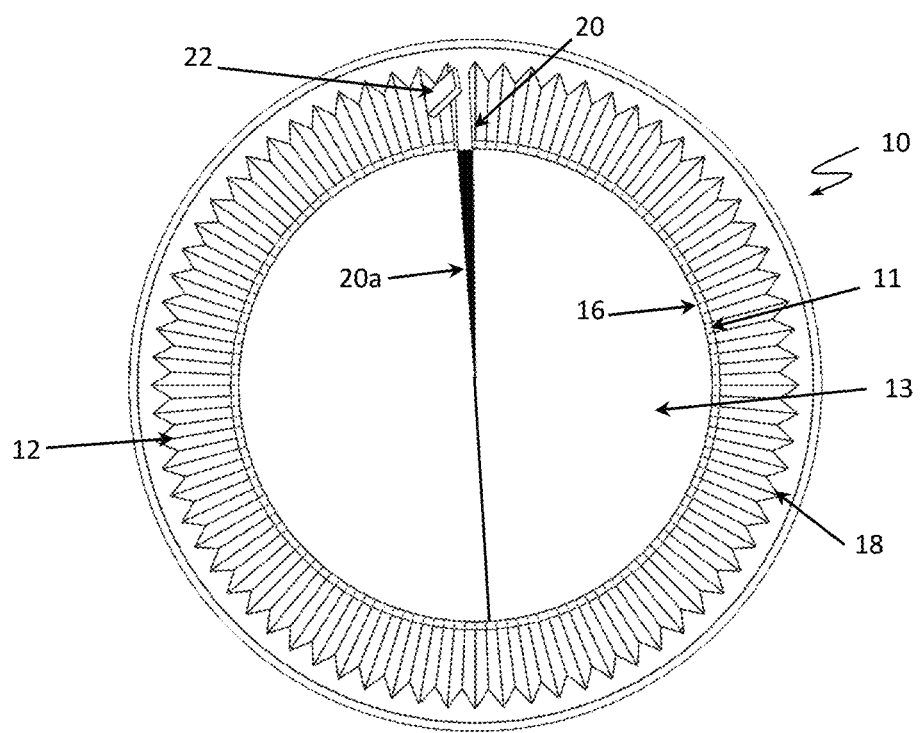
FIG. 2 is a top view of the baking liner of FIG. 1 showing an opening seam extending from a top edge of a liner's sidewall to its bottom and across a base of the liner.
Figure 3:
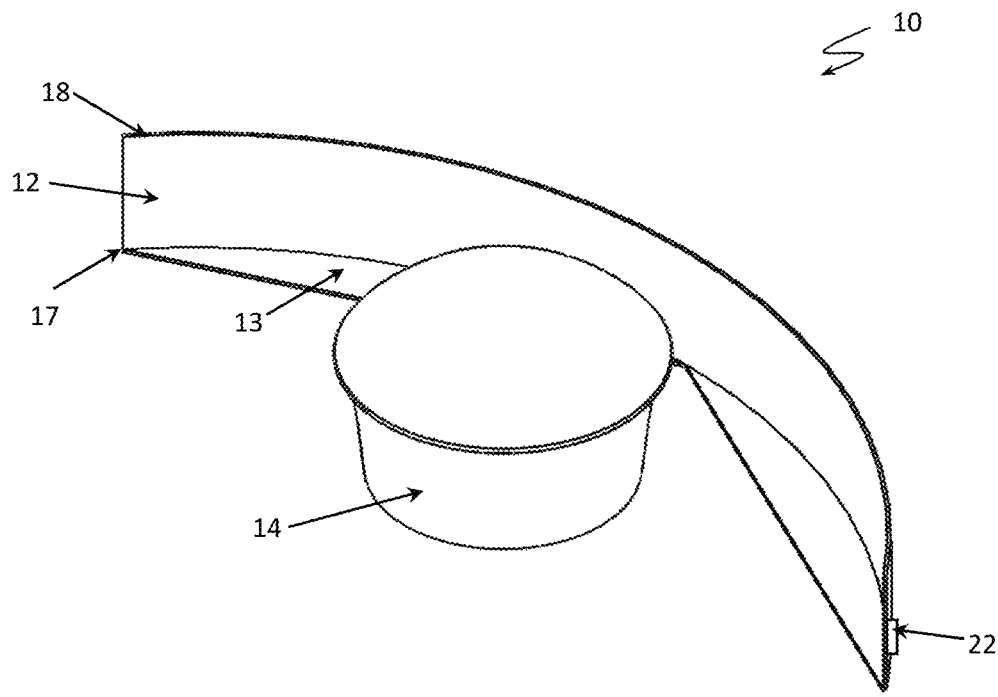
FIG. 3 is a perspective view of the baking liner of FIG. 1 in an open configuration.
Figure 4:
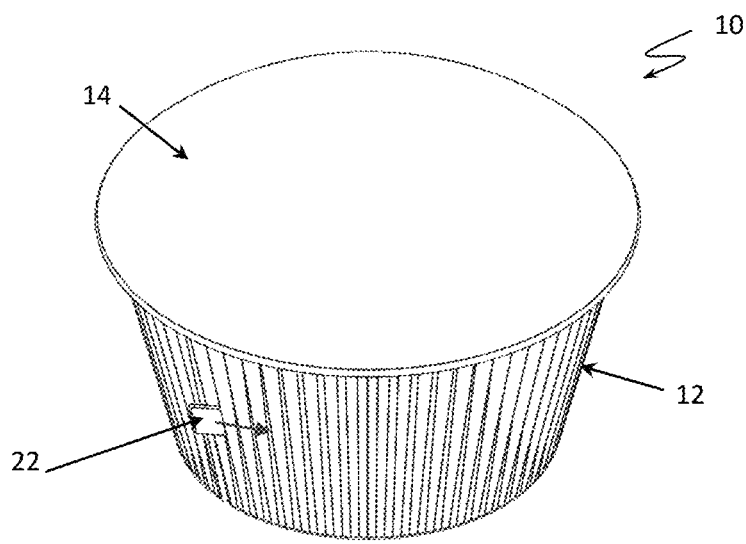
FIG. 4 is a perspective view of the baking liner of FIG. 1 before its removal.

The seam 20 can continue over the bottom edge 17 of the liner 10 and extends across the base 13 forming a base portion 20a of the opening seam 20 (see FIG. 2). By making the seam 20 continue across the base 13, the consumer can remove the liner completely from the baked product since will open the seam and the base 13 as well, separating the sidewall 12 and the base 13 away from the product 14 (see FIG. 3). FIG. 3 illustrates the liner 10 in an open, strip-like (butterfly), configuration pulled away from the baked product 14. In one implementation the position of the opening seam 20 can be emphasized by coloring the liner parts along the seam 20. In another embodiment the tab 22 can be colored for easy noticing. A company logo or any other advertisements or notices can be put on the tab 22.

In one implementation, the opening seam can be perforated opening seam. For example, FIGS. 5-10, illustrate a baking liner 100 with a perforated opening seam 210, that extends from the top edge 180 of the liner 100 to its bottom edge 170. The perforated seam 210 continues across the base 130 forming a base portion 210a of the perforated opening seam 210 (see FIG. 7). The liner 100 can further comprise a pulling tab 220 that is formed in proximity to the perforated opening seam 210. The tab 220 is configured to tear the perforations and open the sidewall 120 (and in some implementations the base 130) into a strap-like (open) configuration away from the baked product. In the example liner illustrated in FIG. 5 the tab 220 is hingedly connected to the top edge 180. In the embodiment illustrated in FIG. 6, the tab 220 is hingedly connected to the sidewall 120 along its longitudinal side, such that the tab 220 extends along the perforated seam 210.

Figure 8:
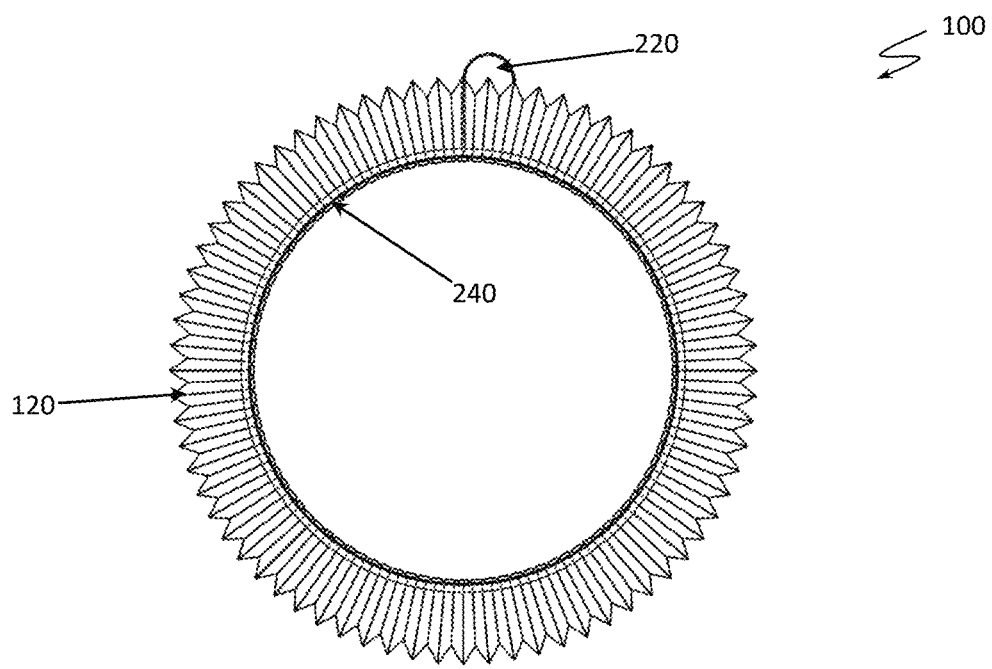
FIG. 8 is a top is a top view of another example of a baking liner with a perforated opening seam extending from a top edge of the liner to its bottom and along a periphery of a base of the liner.

In one implementation, the perforated seam 210 can continue along the periphery of the base 130 (along the bottom edge 170 of the liner 100) forming a base perforated seam 240 (see FIG. 8). In such implementation, when the consumer pulls the tab 22 it will tear the seam 210 as well as the base seam 240 and will open the side wall 120 away from the baked product while leaving the base 130 of the liner 100 at the bottom of the baked product.

Figure 9:
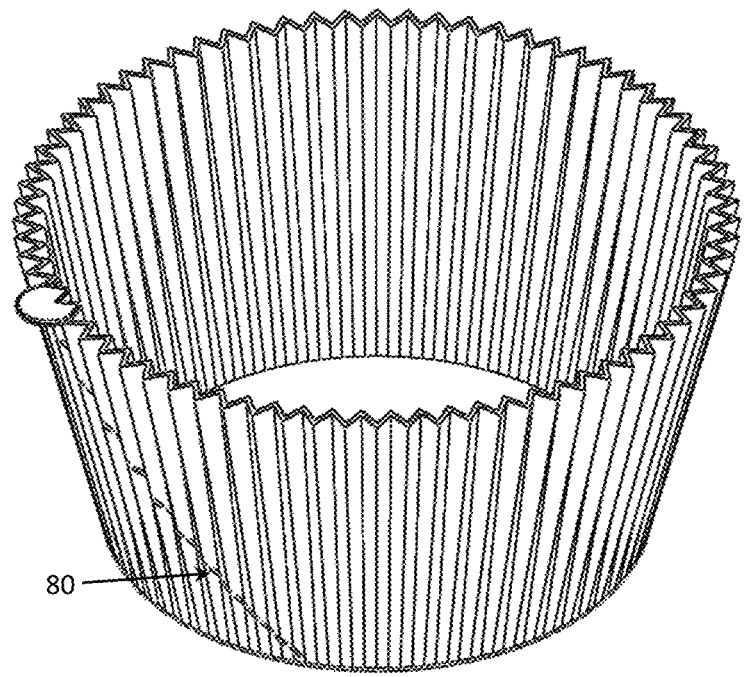
FIG. 9 is a perspective view of another example of a baking liner with a perforated opening seam extending diagonally from a top edge of a sidewall of the liner to its bottom edge.
Figure 10:
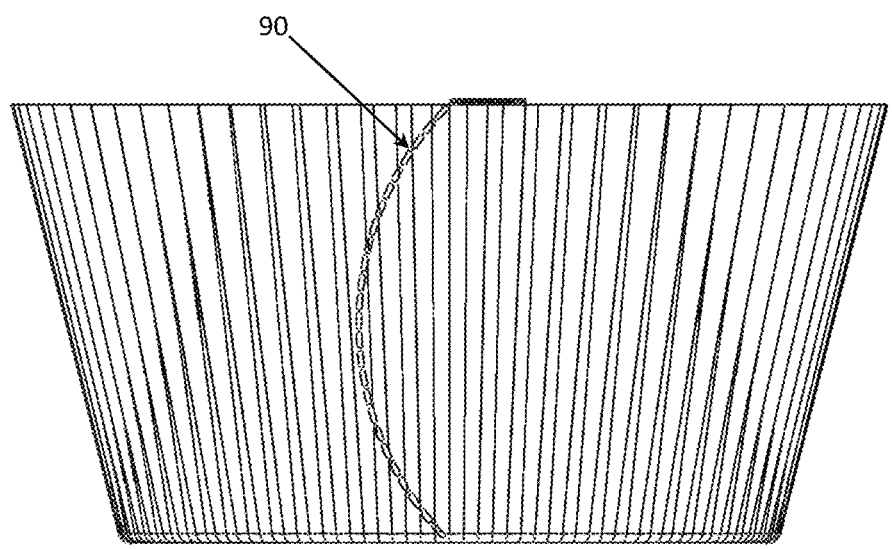
FIG. 10 is a perspective view of another example of a baking liner where a perforated opening seam extends from a top edge of a sidewall of the liner to its bottom edge in a curved configuration.

The perforated opening seam can extend from the top edge to the bottom edge of the liner in a relatively straight configuration as illustrated in FIGS. 1-8, or it can have a diagonal configuration 80 as illustrated in FIG. 9, or a curved configuration 90 as illustrated in FIG. 10, or any other suitable configuration without departing from the scope of the invention.

In one implementation, the perforations along the seam 210 can be scattered and dispersed. For example, instead of having continuous perforations as illustrated in FIGS. 5 to 10, there can be few of such closing links that are positioned at some distance one from another to temporarily close the seam 20, 210. In one embodiment, a number of closing stickers can be used to keep the seam 20, 210 temporarily closed. For example, the liner can comprise one sticker positioned at some point along a sidewall portion of the seam 20, 210 and one sticker positioned at the base portion of the seam 20a, 210a. In one implementation, an adhesive can be added to the liner itself along a length of the seam 20, 210, so that the adhesive edge of the liner overlaps a bit to temporarily close the seam 20, 210, but can be easy to peel open much like a sticky note. In yet another implementation, an adhesive can be put on a surface of the tab 22, 220, so that it overlaps the seam 20, 210 with the adhesive side of the tab used to temporarily close the seam. The adhesive used in any of the above mentioned embodiments and implementations is suitable for use in food industry and can withstand high temperatures of about 200-250° C.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. A baking liner for bakable products comprising:
   i) a base;
   ii) a peripheral sidewall extending upward from the base forming a loop, the base and the sidewall defining a liner cup sized to receive the baked product, the sidewall having an upper edge that forms liner's top edge and a lower edge adjoined to the base forming a bottom edge of the liner;

iii) an opening seam formed in the sidewall and extending from the upper edge toward the lower edge and across the base; and iv) a tab connected to the sidewall in proximity to the opening seam and configured to separate the sidewall and the base along the opening seam into a strap-like configuration by pulling the tab and opening the sidewall and the base away and completely removing the sidewall and the base from the baked product.

2. The baking liner of claim 1, wherein the opening seam comprises a number of perforations.

3. The baking liner of claim 2, wherein the perforations are few and dispersed one from another.

4. The baking liner of claim 1 comprising a number of closing links formed along the opening seam to temporarily close the opening seam.

5. The baking liner of claim 1, wherein one surface of the tab comprises an adhesive, the adhesive surface of the tab overlapping the seam and temporarily closing it, the adhesive surface of the tab being configured to withstand high baking temperatures.

6. The baking liner of claim 1, further comprising an adhesive surface formed along one edge of the seam such that such edge overlaps and temporarily closes the seam, the adhesive surface of the tab being configured to withstand high baking temperatures.

7. The baking liner of claim 1, wherein a portion of the sidewall on either side of the opening seam being highlighted by coloring.

8. The baking liner of claim 1, wherein the tab being highlighted by coloring.

9. The baking liner of claim 1, wherein the tab is hingedly connected to the side wall such that it can move from a position adjacent to the sidewall to a position away from the sidewall.

\* \* \* \* \*